(12) United States Patent
Hidalgo et al.

(10) Patent No.: US 9,562,183 B2
(45) Date of Patent: Feb. 7, 2017

(54) USE OF COMPOUNDS WITH NITROGEN-CONTAINING FUNCTIONAL GROUPS FOR THERMAL ENERGY STORAGE

(75) Inventors: Manuel Hidalgo, Brignais (FR);
Jean-Philippe Gillet, Brignais (FR);
Gilles Barreto, Messimy (FR);
Frederick Mantisi, Lyons (FR)

(73) Assignee: Arkema France, Colombes (FR)

( * ) Notice: Subject to any disclaimer, the term of this patent is extended or adjusted under 35 U.S.C. 154(b) by 936 days.

(21) Appl. No.: 13/404,388

(22) Filed: Feb. 24, 2012

(65) Prior Publication Data
US 2013/0056175 A1  Mar. 7, 2013

(30) Foreign Application Priority Data

Feb. 25, 2011 (FR) ..................... 11 51530

(51) Int. Cl.
F28D 17/00 (2006.01)
F28D 19/00 (2006.01)
C09K 5/06 (2006.01)
F28D 20/02 (2006.01)

(52) U.S. Cl.
CPC ............. C09K 5/063 (2013.01); F28D 20/021 (2013.01); *Y02E 60/145* (2013.01); *Y02E 70/30* (2013.01)

(58) Field of Classification Search
CPC ...... C09K 5/063; F28D 20/021; Y02E 60/145; Y02E 70/30
USPC ..................................... 165/4, 10
See application file for complete search history.

(56) References Cited

U.S. PATENT DOCUMENTS

| | | | | |
|---|---|---|---|---|
| 4,100,091 A | * | 7/1978 | Powell | 252/70 |
| 4,400,287 A | * | 8/1983 | Kimura et al. | 252/70 |
| 4,412,930 A | * | 11/1983 | Koike et al. | 252/70 |
| 4,448,702 A | * | 5/1984 | Kaes | 252/70 |
| 4,537,695 A | * | 8/1985 | Hawe et al. | 252/70 |
| 5,755,988 A | | 5/1998 | Lane | |
| 9,249,269 B2 | * | 2/2016 | Biggin | C08J 9/0004 |
| 2005/0208286 A1 | | 9/2005 | Hartmann | |
| 2010/0135940 A1 | | 6/2010 | Grimaldi | |

FOREIGN PATENT DOCUMENTS

| | | |
|---|---|---|
| DE | 102007002796 A1 | 7/2008 |
| EP | 0928820 A2 | 7/1999 |
| FR | 2905698 A1 | 3/2008 |

OTHER PUBLICATIONS

Salman, M., "Calorimetric Study of the Reaction Between Formic Acid and N,N,N', '-Tetramethylethylenediamine from the Aspect of the Thermal Energy Storage", Journal of Thermal Analysis, vol. 37, (1991), 2389-2394.

Usmani, A. M., "Phase Change Clathrate Materials for Energy Storage", Journal of Materials Science Letters 2 (1983), 681-682.

Waschull, J., "Investigation of Phase Change Materials for Elevated Temperatures", 2nd International Renewable Energy Storage Conference (IRES II), (Nov. 19-21, 2007) 8 pgs.

* cited by examiner

Primary Examiner — Ljiljana Ciric
(74) Attorney, Agent, or Firm — RatnerPrestia

(57) ABSTRACT

A compound consisting of a linear saturated $C_8$-$C_{24}$ hydrocarbon-based chain bearing at each end a nitrogen-containing functional group, other than —$NH_2$, is used for the storage of thermal energy.

A process for the storage and optionally for the release of thermal energy comprises the contacting of a wall to be cooled with a first heat transfer fluid then of said first heat transfer fluid with a material comprising said compound and optionally the contacting of said material with a second heat transfer fluid then of said second heat transfer fluid with a wall to be heated.

15 Claims, No Drawings

USE OF COMPOUNDS WITH NITROGEN-CONTAINING FUNCTIONAL GROUPS FOR THERMAL ENERGY STORAGE

CROSS-REFERENCE TO RELATED APPLICATION

This application claims priority to French application no. 11.51530, filed Feb. 25, 2011, and incorporated herein by reference in its entirety for all purposes.

FIELD OF THE INVENTION

The present invention relates to the use of compounds with nitrogen-containing functional groups for thermal energy storage.

BACKGROUND OF THE INVENTION

Phase change materials (or PCMs) are materials capable of storing energy in a latent manner during a reversible physical change of state. The energy density and compactness of the energy storage elements manufactured from these materials render them substantially more competitive than sensible heat storage materials, which store the energy in the form of a rise in their temperature (without phase change).

Specifically, PCMs have the capacity to absorb a certain amount of heat when they pass from one physical state to another, generally during the melting thereof, with a moderate modification of their temperature and of that of their environment, and to release heat by returning to their original physical state, especially by recrystallizing. These materials are all the more advantageous when the amount of heat exchanged during these phase changes is large. In the case of a solid/liquid transition, this is expressed by their enthalpy of fusion or of crystallization. The melting temperatures and crystallization temperatures of the PCMs furthermore determine the possible applications thereof. Among these, mention may be made of the cooling of food products or of pharmaceutical products that are sensitive to heat, of textile materials, of engines, of electronic components and circuits or of waste combustion plants. On the industrial scale, the PCMs also form a means for recovering the heat that is released or that is available contained in containers or equipment (such as chemical reactors, generators of electrical or mechanical energy) or in process streams or fluids (for example cooling/heating circuits, effluents), especially during certain exothermic chemical reactions. The heat released may then be reused to provide energy to other reactions, which makes it possible to reduce the industrial consumption of fossil energy or electrical energy. The use of PCMs in air conditioning cycles (heating/cooling) is also an example of an application where it is possible to efficiently store thermal energy in order to then release it at the desired time and in the desired amount.

The most common PCM material is none other than water. During its solid/liquid transition (and therefore implicitly liquid/solid transition), it makes it possible to absorb or release large amounts of heat. It is in this way that tanks or pools of water at a temperature close to 0° C., which is free (in the form of an ice/liquid water mixture) or is encapsulated, for example in balls made of plastic or other materials, constitute a simple example of a PCM system capable of storing (during the melting of the ice) and of releasing (during the crystallization of the liquid water) large amounts of energy per unit mass of water. However, water, although abundant, available and non-toxic, cannot solve all the possible problems as regards efficiency of heat exchange due to its restricted usage range (around 0° C.) and problems linked to the high volume expansion of the ice during its formation.

Other common PCMs include paraffins and fatty acids, such as dodecanoic acid, used for the air conditioning of buildings, hydrated salts such as $Mn(NO_3)_2.H_2O$, $MnCl_2.H_2O$, $Na_2S_2O_3.5H_2O$ and $CH_2COONa.3H_2O$ and eutectic mixtures, especially of capric acid and of lauric acid. These compounds generally have quite low melting temperatures, ranging from 15 to 48° C. approximately. Around 150° C., adipic acid ($C_6H_{10}O_4$, 152° C.), or maltitol ($C_{12}H_{24}O_{11}$, 145° C.) are known and for melting temperatures in the vicinity of 300° C., the PCMs known are, for example, salts such as $NaNO_3$ (307° C.), $KNO_3$ (333° C.). However, these PCMs have many drawbacks impeding their industrial development. In particular, organic PCMs may be flammable, have a low thermal conductivity in the solid state, require high heat transfers during the freezing cycle, and have a low volumetric latent heat. Furthermore, paraffins may pose problems of supply, cost and generation of $CO_2$ due to their petroleum origin. Inorganic PCMs generate, for their part, significant supercooling phenomena. Moreover, their phase transition temperatures are not constant due, in particular, to their hygroscopicity. Finally, they are capable of resulting in a corrosion of the metals with which they are in contact, which leads to unacceptable maintenance costs.

To overcome some of the aforementioned drawbacks, it has been proposed to use plant or animal waxes, such as beeswax, sugar alcohols such as erythritol, and linear fatty acids or diacids of plant origin which offer a choice of transition temperatures (from 20 to 155° C.) and of latent heat of fusion (from 140 to 240 J/g) as a function of their chain length, of their degree of unsaturation and of their acid functions, linked to their crystallinity (see Investigation of Phase Change Materials for Elevated Temperatures, J. Waschull, R. Müller and S. Römer, Institute for Air Conditioning and Refrigeration Dresden (ILK Dresden), Stockton University, Energy studies, 2009).

Furthermore, certain amine-containing materials have been described as PCMs. These are in particular clathrates consisting of quaternized N,N,N',N'-tetramethylethylenediamine and of quaternized N,N,N',N'-tetramethyl-1,6-hexanediamine described by Usmani, A. in *Journal of Materials Science Letters*, 2 (1983) 681-682, which have a melting point from 0 to 31° C., and adducts of formic acid and of N,N,N',N'-tetramethylethylenediamine described by Salman, M. et al. in *Journal of Thermal Analysis*, Vol. 37 (1991) 2389-2394. The first of these adducts, A4B, has a melting temperature of 18° C. whereas the second, A2B, has a melting temperature of 60° C. but is presented as thermally unstable. Document EP 0 094 366 additionally discloses a thermal energy storage system using a PCM consisting of a diamine of formula $H_2N—(CH_2)_n—NH_2$ where n is an integer ranging from 4 to 14. These compounds have melting temperatures from 16 to 73° C. approximately but they also exhibit a poor thermal stability that results in a loss of heat storage efficiency.

Furthermore, known from US 2005/208286 is a polymeric composite comprising an optionally encapsulated PCM, a polymeric dispersant and optionally a polymeric matrix, intended for the manufacture of synthetic fibers. The PCM may be chosen from a wide range of compounds, such as diacids, polymers and preferably hydrocarbons. However, polymers are not good PCMs as their long chains prevent reaching of a high phase transition energy.

Known from DE 10 2007 002796 are PCMs based on amides, especially bisamides, such as ethylenebis(stearamide). However, because of the crystallographic arrangement of such compounds, a good compromise between the need for a high fusion temperature and the need for a high phase transition energy can not be achieved.

Document U.S. Pat. No. 5,755,988 itself teaches the use of a diacid, such as sebacic acid, as a PCM. The inventors have observed that this compound is too volatile and has a tendency to degrade at high temperature, especially in the range 150-200° C., which makes it unsuitable for being used as a PCM in certain applications.

Consequently, the need remains to provide PCMs of renewable origin, having a melting temperature between 0° C. and 250° C. and preferably between 25° C. and 240° C., which are thermally stable, that is to say that are capable of undergoing a large number of melting/solidification cycles without degrading and of melting and crystallizing in a narrow and constant temperature range during the cycles. It would also be desirable for these compounds to have high enthalpies of fusion and of crystallization and a low flammability.

BRIEF SUMMARY OF THE INVENTION

The inventors have discovered that certain difunctional nitrogen-containing compounds, in particular derivatives of bisamides, make it possible to meet these needs.

DETAILED DESCRIPTION OF THE INVENTION

Some of these compounds are already known as wet adhesion promoters, especially in latex paints (EP 0 928 820), or as supramolecular polymers that can be used as additives in the manufacture of hot-melt adhesives or coatings, in particular (FR 2 905 698). However, to the knowledge of the inventors, their heat absorption/release properties have never been evaluated before, so that it has never before been envisaged to use them for thermal energy storage.

Therefore, one subject of the present invention is the use of a compound consisting of a linear $C_8$-$C_{24}$ hydrocarbon-based chain (preferably containing from 10 to carbon atoms) bearing at each end a nitrogen-containing functional group, other than —$NH_2$, for the storage of thermal energy.

The expression "functional group" is understood, in the present description, to mean the nonhydrocarbon-based part of a molecule, consisting of a group of atoms characterizing a class of organic compounds and which determines the reactivity and the properties of this class of compounds. The expression "nitrogen-containing functional group" is understood to mean a functional group comprising at least one nitrogen atom optionally associated with a carbon atom and/or with an oxygen atom. Examples of nitrogen-containing functional groups are in particular amine, nitrile, imine, carbodiimide, amide, imide, carbamate and urea groups, without this list being limiting.

The compound used according to the invention is advantageously a bisamide or an optionally salified bisamide derivative. The expression "bisamide derivative" is understood to mean any compound capable of being obtained from a bisamide following a chemical reaction in one step, such as a dehydration or reduction, or in several steps, such as a dehydration followed by a hydrogenation. This expression therefore includes diamines and dinitriles.

In a first variant of the invention, this compound may thus be chosen from the bisamides of formula (I):

$$R_1R_2N-CO-(CH_2)_n-CO-NR_1R_2 \quad (I)$$

where n is an integer ranging from 6 to 24 and $R_1$, $R_2$ independently denote a hydrogen atom; a $C_1$-$C_{10}$ alkyl group; a group Ra—N—RbRc where Ra is a —$(CH_2)_x$—(NH—$CH_2$—$CH_2)_m$— chain where m is an integer ranging from 0 to 6, x is an integer ranging from 1 to 4 and Rb, Rc are each H or form together and with the nitrogen atom to which they are attached a nitrogen-containing heterocycle optionally interrupted by at least one other nitrogen atom and optionally substituted by an oxo group. Examples of nitrogen-containing heterocycles include dinitrogen-containing and trinitrogen-containing heterocycles and more particularly imidazolidonyl and ureido-pyrimidyl groups.

According to one preferred embodiment of the invention, n is an integer ranging from 8 to 16, $R_1$=H and $R_2$=Ra—N—RbRc where Ra is a —$CH_2$—$CH_2$— chain and Rb, Rc form a five- or six-membered saturated dinitrogen-containing heterocycle with the nitrogen atom to which they are attached, preferably an imidazolidonyl group. More preferably still, the compound used according to the invention is the bisamide of 2-aminoethylimidazolidinone or 1-(2-aminoethyl)imidazolidin-2-one (hereinafter "UDETA") and of a dicarboxylic acid of plant origin, advantageously containing from 10 to 18 carbon atoms.

According to another embodiment of the invention, n is an integer ranging from 6 to 20, preferably from 8 to 16, $R_1$=H and $R_2$=H. Examples of such compounds are 1,8-octanediamide(subericamide), 1,10-decanediamide(sebacamide), 1,12-dodecanediamide, 1,14-tetradecanediamide, 1,16-hexadecanediamide, 1,18-octadecanediamide, 1,20-eicosanediamide and combinations thereof, more preferably 1,10-decanediamide.

Generally, the bisamide derivatives are obtained by reaction of a fatty diacid HOOC—$(CH_2)_n$—COOH with an amine $NHR_1R_2$ at temperatures above 100° C., such that the water formed distills from the reaction medium. Generally, the reaction is carried out without solvent but there is nothing standing in the way of using one if it is suitable for the operating conditions.

In a second variant, the compound used according to the invention may be chosen from the dinitriles of formula (II):

$$N\equiv C-(CH_2)_p-C\equiv N \quad (II)$$

where p is an integer ranging from 6 to 24, preferably from 8 to 16.

According to one embodiment of the invention, p is an integer ranging from 6 to 20, preferably from 8 to 16. Examples of such compounds are 1,6-hexanedinitrile(suberonitrile), 1,8-octanedinitrile (sebaconitrile), 1,10-decanedinitrile, 1,12-dodecanedinitrile, 1,14-tetradecanedinitrile, 1-16-hexadecanedinitrile, 1,18-octadecanedinitrile, 1,20-eicosanedinitrile and combinations thereof. The 1,8-octanedinitrile, 1,12-dodecanedinitrile, 1-16-hexadecanedinitrile and combinations thereof are more preferred.

Generally, the dinitriles are obtained by reaction of a fatty diacid HOOC—$(CH_2)_p$—COOH in the presence of ammonia and of a catalyst such as metal oxides. The reaction is carried out at temperatures between 250° C. and 450° C. The fatty diacid is successively converted to ammonium salts, to unsubstituted bisamides then to dinitriles.

As examples of fatty diacid which may be used, mention may be made of 1,8-octanedioic acid (suberic acid), 1,10- decanedioic acid (sebacic acid), 1,12-dodecanedioic acid, 1,14-tetradecanedioic acid, 1,16-hexadecanedioic acid, 1,18-octadecanedioic acid and combinations thereof. The 1,10-decanedioic acid, 1,14-tetradecanedioic acid, 1,18-octadecanedioic acid and combinations thereof are more preferred.

In a third variant, this compound may be chosen from the polyamines of formula (III):

$$R_3R_4N\text{---}(CH_2)_q\text{---}NR_3R_4 \quad \text{(III)}$$

where q is an integer ranging from 6 to 24, preferably from 8 to 16; $R_3$ is a propylamine, polypropylamine, alkylcarbonyl or alkylsulfonyl group optionally containing an alkoxylated unit $(CH_2\text{---}CH_2\text{---}O)_y$; and $R_4$ is H or a propylamine, polypropylamine, alkylcarbonyl or alkylsulfonyl group optionally containing an alkoxylated unit $(CH_2\text{---}CH_2\text{---}O)_y$, where y is an integer ranging from 1 to 6.

Preferred alkoxylated units are ethoxylated and propoxylated units.

As examples of polyamines of formula (III) which may be used, mention may be made of: 1,8-octanediamine,$N^1,N^8$-bis(3-aminopropyl), 1,10-decanediamine,$N^1,N^{10}$-bis(3-aminopropyl), 1,12-dodecanediamine,$N^1,N^{12}$-bis(3-aminopropyl), 1,14-tetradecanediamine,$N^1,N^{14}$-bis(3-aminopropyl), 1,16-hexadecanediamine,$N^1,N^{16}$-bis(3-aminopropyl), 1,18-octadecanediamine,$N^1,N^{18}$-bis(3-aminopropyl), 1,20-eicosanediamine,$N^1,N^{20}$-bis(3-aminopropyl); 1,8-octanediamine,$N^1,N^8$-bis[1,3-propanediamine,N-(3-aminopropyl)], 1,10-decanediamine,$N^1,N^{10}$-bis[1,3-propanediamine,N-(3-aminopropyl)], 1,12-dodecanediamine,$N^1,N^{12}$-bis[1,3-propandiamine,N-(3-aminopropyl)], 1,14-tetradecanediamine,$N^1,N^{14}$-bis[1,3-propanediamine,N-(3-aminopropyl)], 1,16-hexadecanediamine,$N^1,N^{16}$-bis[1,3-propanediamine,N-(3-aminopropyl)], 1,18-octadecandiamine,$N^1,N^{18}$-bis[1,3-propanediamine,N-(3-aminopropyl)], 1,20-eicosanediamine,$N^1,N^{20}$-bis[1,3-propanediamine,N-(3-aminopropyl)]; 1,8-octanediamine,$N^1,N^8$-bis(acetyl), 1,10-decanediamine,$N^1,N^{10}$-bis(acetyl), 1,12-dodecanediamine, $N^1,N^{12}$-bis(acetyl), 1,14-tetradecanediamine,$N^1,N^{14}$-bis(acetyl), 1,16-hexadecanediamine,$N^1,N^{16}$-bis(acetyl), 1,18-octadecanediamine,$N^1,N^{18}$-bis(acetyl), 1,20-eicosanediamine,$N^1,N^{20}$-bis(acetyl); 1,8-octanediamine,$N^1$,$N^8$-bis(methanesulfonyl), 1,10-decanediamine,$N^1,N^{10}$-bis (methanesulfonyl), 1,12-dodecanediamine,$N^1,N^{12}$-bis (methanesulfonyl), 1,14-tetradecanediamine,$N^1,N^{14}$-bis (methanesulfonyl), 1,16-hexadecanediamine,$N^1,N^{16}$-bis (methanesulfonyl), 1,18-octadecanediamine,$N^1,N^{18}$-bis (methanesulfonyl), 1,20-eicosanediamine,$N^1,N^{20}$-bis (methanesulfonyl); 1,8-octanediamine,$N^1,N^1,N^8,N^8$-tetra(2-hydroxyethyl), 1,10-decanediamine,$N^1,N^1,N^{10},N^{10}$-tetra(2-hydroxyethyl), 1,12-dodecanediamine,$N^1,N^1,N^{12},N^{12}$-tetra (2-hydroxyethyl), 1,14-tetradecanediamine,$N^1,N^1,N^{14},N^{14}$-tetra(2-hydroxyethyl), 1,16-hexadecanediamine,$N^1,N^1,N^{16}$, $N^{16}$-tetra(2-hydroxyethyl), 1,18-octadecanediamine,$N^1,N^1$, $N^{18},N^{18}$-tetra(2-hydroxyethyl), 1,20-eicosanediamine,$N^1$, $N^1,N^{20},N^{20}$-tetra(2-hydroxyethyl); and combinations thereof.

Generally, the primary polyamines are obtained conventionally by hydrogenation of the aforementioned dinitriles. The catalysts are customarily Raney nickel or cobalt which may or may not be doped. The reaction may be carried out in a solvent medium or non-solvent medium. The polyamines are obtained by the following sequences which may be repeated, or not, several times: Michael addition of acrylonitrile to the initial amine function followed by a step of hydrogenation in order to result in the propylamine unit.

The aforementioned compounds, especially the polyamines, may be used according to the invention in the form of organic or inorganic salts, in particular their chlorides, sulfates, sulfonates, alkyl ether sulfates, alkyl ether sulfonates and alkyl ether phosphates for example.

The inventors have demonstrated that these compounds exhibited a combination of highly advantageous characteristics for use in thermal energy storage, namely:

a melting temperature, as measured by DSC, between 0° C. and 250° C., more particularly between 25° C. and 240° C. and preferably between 175° C. and 200° C., optionally, a crystallization temperature, as measured by DSC, between −25° C. and 240° C., more particularly between 0° C. and 230° C. and preferably between 120° C. and 190° C., an enthalpy of fusion, as measured by DSC, of at least 100 J/g, more particularly of at least 120 J/g or even at least 135 J/g and ranging, for example, up to 365 J/g, optionally, an enthalpy of crystallization, as measured by DSC, of at least 80 J/g, more particularly of at least 100 J/g and ranging, for example, up to 365 J/g, a good thermal stability, resulting in a capacity to undergo at least 5, in particular at least 10, or even at least 50 successive melting/crystallization cycles, without:

1—the variation of their melting temperature during the cycles, as measured by DSC, exceeding 10% or even 5%, and/or 2—the variation of their crystallization temperature during the cycles, as measured by DSC, exceeding 10% or even 5%, and/or 3—the variation of their enthalpy of fusion during the cycles, as measured by DSC, exceeding 20% or even 15%, and/or 4—the variation of their enthalpy of crystallization during the cycles, as measured by DSC, exceeding 10% or even 7%, and/or 5—their loss of mass between the first cycle and the last cycle exceeding 10%, preferably 5%, or even 1%, as measured, for example, using a (heating/cooling) ramp rate for the DSC ranging from 1 to 20° C./min, in particular 10° C./min.

It should be noted that, in this description, the expression "between" should be interpreted as including the cited limits.

The compounds described previously are used, in the present invention, in the form of a material capable of containing, besides these compounds, various additives such as titanium dioxide (support material enabling the production of polymer composite) or nucleating agents, or even other phase change materials with which these compounds are capable of forming eutectic mixtures. In addition, in this material, the compounds described previously may be in encapsulated form, for example in a casing based on a polymer of polystyrene, polyvinyl alcohol or polyurethane type, or included in synthetic textile fibers.

This material may be used in particular in a device suitable for the cooling of food products, of heat-sensitive pharmaceutical products, of textile materials, of engines or of electronic components and circuits, for the heat recovery of chemical reactors or waste combustion plants or for the storage of solar energy. The heat absorbed by the compounds used according to the invention may then be released in order to enable the heating of a wall such as a chemical reactor chamber or of a fluid.

Another subject of the invention is therefore a process for the storage and optionally for the release of thermal energy, comprising the contacting of a wall to be cooled with a first heat transfer fluid then of said first heat transfer fluid with a material comprising at least one compound as described previously, and optionally the contacting of said material with a second heat transfer fluid then optionally of said second heat transfer fluid with a wall to be heated.

In this process, the heat transfer fluid may comprise air, water, a glycol, brines of thermally conductive salts, silicone-based oils, oils resulting from the refining of petroleum cuts, oils of plant origin, and mixtures thereof.

The invention will be better understood in light of the following examples, given for illustration purposes only and which do not have the aim of restricting the scope of the invention, defined by the appended claims.

EXAMPLES

Example 1

Synthesis of Bisamides of UDETA

Three bisamides of saturated linear fatty acids and of UDETA were prepared, according to the following reaction scheme:

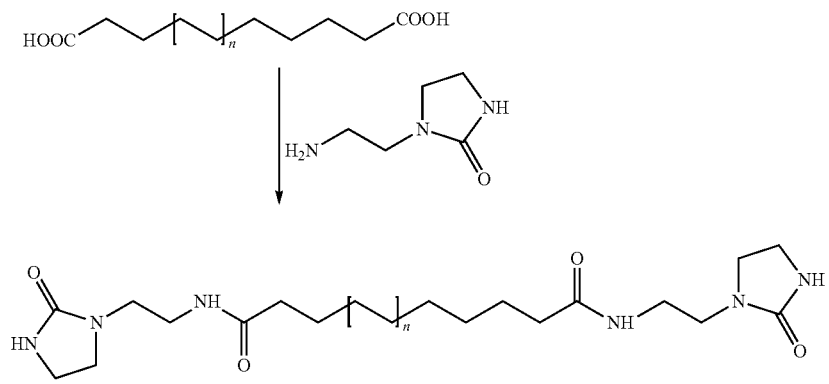

n = 1,3,5

In order to do this, 0.5M (157.25 g) of octadecanedioic acid was charged to a previously dried 500 cm$^3$ reactor, equipped with a mechanical stirrer of anchor type, a heater, a condenser of Dean-Stark type and a nitrogen inerting system. The reaction medium was brought to 170-180° C. with stirring and nitrogen inerting of the reactor head space. It is possible to sparge nitrogen when the acid is melted at more than 130° C., in order to limit the final coloration. Next, added dropwise was 1M of molten 1-(2-aminoethyl) imidazolidin-2-one (UDETA), of purity 95%, the equivalent molar mass of which was determined by assaying the total alkalinity (theoretical molar mass=129 g/mol). The temperature was maintained between 170° C. and 180° C. until the end of the reaction. The water formed was distilled as soon as it formed. When the reaction was completed, the hot product was emptied into a Schott glass flask. The final product was characterized by its acid value (AV) and its total alkalinity.

In the same way, a bisamide of tetradecanedioic acid and of UDETA and a bisamide of sebacic acid and of UDETA were prepared.

Example 2

DSC Analysis of the Bisamides of UDETA calorimetric tests were carried out by DSC (differential scanning calorimetry) using a DSC Q10 machine from the company TA Instruments equipped with a cooling bath enabling temperature scans between −70° C. and the chosen upper temperature (250° C. maximum for the products tested) to be carried out. The tests were conducted with sample masses between 6 and 15 mg and by varying the heating or cooling ramps between 1 and 20° C./min, the value of 10° C./min being the most frequently used. Heating/cooling cycles were thus able to be carried out. A first series of scans between −70° C. and 250° C. made it possible to identify the temperature zone during which the melting phase transitions (on heating) and the crystallization phase transitions (on cooling) were observed. This first series made it possible to demonstrate that no thermal phase transition phenomenon was observed below 50° C. The cycles were consequently conducted starting from at least 50° C.

2A—Test Over 3 Cycles at 10° C./min

Table I below shows the values of the temperatures at the melting and crystallization peaks for the 3 diamides of UDETA synthesized in example 1 (C18, C14, C10), during tests over 3 heating/cooling cycles at 10° C./min between 50° C. and 250° C. The enthalpies of fusion and of crystallization are also given. After the three cycles, the losses of mass were quantified by weighing the dish containing the sample and by calculating the difference in weight compared with the initial weight before the test. The losses of mass were respectively 0.2, 0.3 and 0.5 mg after three cycles, for the C18, C14 and C10 diamides.

TABLE I

| | C18 UDETA diamide | C14 UDETA diamide | C10 UDETA diamide |
| --- | --- | --- | --- |
| Melting temperatures at the peak (° C.) $1^{st}/2^{nd}/3^{rd}$ cycle | 178/177/177 | 187/181/180 | 199/195/195 |
| Crystallization temperatures at the peak (° C.) $1^{st}/2^{nd}/3^{rd}$ cycle | 149/148/147 | 144/142/140 | 127/126/124 |

TABLE I-continued

|  | C18 UDETA diamide | C14 UDETA diamide | C10 UDETA diamide |
|---|---|---|---|
| Enthalpies of fusion (J/g) $1^{st}/2^{nd}/3^{rd}$ cycle | 163/144/142 | 159/143/142 | 135/119/118 |
| Enthalpies of crystallization (J/g) $1^{st}/2^{nd}/3^{rd}$ cycle | 135/135/133 | 131/126/125 | 100/101/97 |

It should be noted that despite rises in temperature ranging up to 250° C., the products continued to melt and crystallize quite reproducibly, which can be seen in particular by the stability of the temperatures of the melting and crystallization peaks and of the enthalpy values, in particular in crystallization. Furthermore, the loss of mass was practically zero (<1 mg) after these cycles.

2B—Test Over 5 Cycles at 10° C./min

Table II shows the values of the temperatures at the melting and crystallization peaks for 2 of the UDETA diamides synthesized (C18, C14), during tests over 5 heating/cooling cycles at 10° C./min between 50° C. and 250° C. The enthalpies of fusion and of crystallization are also given. After the five cycles, the losses of mass were quantified by weighing the dish containing the sample and by calculating the difference in weight compared with the initial weight before the test. The losses of mass were respectively 0 and 0.3 mg after five cycles, for the C18 and C14 diamides.

TABLE II

|  | C18 UDETA diamide | C14 UDETA diamide |
|---|---|---|
| Melting temperatures at the peak (° C.) $1^{st}/2^{nd}/3^{rd}/4^{th}/5^{th}$ cycle | 179/177/177/176/176 | 186/181/180/179/178 |
| Crystallization temperatures at the peak (° C.) $1^{st}/2^{nd}/3^{rd}/4^{th}/5^{th}$ cycle | 150/149/149/148/147 | 144/143/141/140/138 |
| Enthalpies of fusion (J/g) $1^{st}/2^{nd}/3^{rd}/4^{th}/5^{th}$ cycle | 147/146/144/141/138 | 157/146/144/141/137 |
| Enthalpies of crystallization (J/g) $1^{st}/2^{nd}/3^{rd}/4^{th}/5^{th}$ cycle | 136/135/132/132/130 | 132/129/128/126/124 |

It should again be noted that despite rises in temperature ranging up to 250° C., the products continued to melt and crystallize quite reproducibly, which can be seen in particular by the stability of the temperatures of the melting and crystallization peaks and of the enthalpy values. Furthermore, the loss of mass was practically zero (<1 mg) after these cycles.

2C—Test Over 5 Cycles at 5° C./min

Table III shows the values of the temperatures at the melting and crystallization peaks for 2 of the UDETA diamides synthesized (C18, C14), during tests over 5 heating/cooling cycles at 5° C./min between 80° C. and 230° C. The enthalpies of fusion and of crystallization are also given. After the five cycles, the losses of mass were quantified by weighing the dish containing the sample and by calculating the difference in weight compared with the initial weight before the test. The losses of mass were respectively 0.3 and 0.2 mg after five cycles, for the C18 and C14 diamides.

TABLE III

|  | C18 UDETA diamide | C14 UDETA diamide |
|---|---|---|
| Melting temperatures at the peak (° C.) $1^{st}/2^{nd}/3^{rd}/4^{th}/5^{th}$ cycle | 177/177/177/177/176 | 187/187/183/182/181 |
| Crystallization temperatures at the peak (° C.) $1^{st}/2^{nd}/3^{rd}/4^{th}/5^{th}$ cycle | 152/152/151/151/151 | 148/148/147/146/146 |
| Enthalpies of fusion (J/g) $1^{st}/2^{nd}/3^{rd}/4^{th}/5^{th}$ cycle | 161/165/145/142/142 | 149/138/141/138/140 |
| Enthalpies of crystallization (J/g) $1^{st}/2^{nd}/3^{rd}/4^{th}/5^{th}$ cycle | 140/139/137/138/136 | 133/132/132/131/130 |

2D—Test Over 1 Cycle at 1° C./min

Table IV shows the values of the temperatures at the melting and crystallization peaks for 2 of the UDETA diamides synthesized (C18, C14), during tests over 1 heating/cooling cycle at 1° C./min between 80° C. and 220° C. The enthalpies of fusion and of crystallization are also given. After this cycle, the losses of mass were quantified by weighing the dish containing the sample and by calculating the difference in weight compared with the initial weight before the test. The losses of mass were respectively 0.7 and 0.3 mg for the C18 and C14 diamides.

TABLE IV

|  | C18 UDETA diamide | C14 UDETA diamide |
|---|---|---|
| Melting temperature at the peak (° C.) | 186 | 191 |
| Crystallization temperature at the peak (° C.) | 157 | 154 |
| Enthalpy of fusion (J/g) | 152 | 141 |
| Enthalpy of crystallization (J/g) | 145 | 139 |

Overall, the reduction of the ramp rate made it possible to improve the reproducibility of the measurements. It also had an effect of increasing the melting and crystallization temperatures and also the phase change enthalpies. The thermal stability, reflected by a low loss of mass of the samples (<1 mg), remained outstanding.

2E—Test Over 10 Cycles at 10° C./min

Table V shows the values of the temperatures at the melting and crystallization peaks for 2 of the UDETA diamides synthesized (C18, C14), during tests over 10 heating/cooling cycles at 10° C./min between 80° C. and 220° C. The enthalpies of fusion and of crystallization are also given. After the ten cycles, the losses of mass were quantified by weighing the dish containing the sample and by calculating the difference in weight compared with the initial weight before the test. The losses of mass were respectively 0.1 and 0.1 mg after ten cycles, for the C18 and C14 diamides.

TABLE V

|  | C18 UDETA diamide | C14 UDETA diamide |
|---|---|---|
| Melting temperatures at the peak (° C.) $1^{st}/2^{nd}/3^{rd}/4^{th}/5^{th}/6^{th}/7^{th}/8^{th}/9^{th}/10^{th}$ cycle | 178/178/178/178/178/178/177/177/177/177 | 189/185/185/184/184/184/183/183/183/183 |
| Crystallization temperatures at the peak (° C.) $1^{st}/2^{nd}/3^{rd}/4^{th}/5^{th}/6^{th}/7^{th}/8^{th}/9^{th}/10^{th}$ cycle | 151/150/150/149/149/149/149/148/148/148 | 146/145/145/144/144/144/144/143/143/143 |
| Enthalpies of fusion (J/g) $1^{st}/2^{nd}/3^{rd}/4^{th}/5^{th}/6^{th}/7^{th}/8^{th}/9^{th}/10^{th}$ cycle | 139/148/147/145/145/145/144/145/144/144 | 152/143/142/141/142/141/141/142/142/140 |
| Enthalpies of crystallization (J/g) $1^{st}/2^{nd}/3^{rd}/4^{th}/5^{th}/6^{th}/7^{th}/8^{th}/9^{th}/10^{th}$ cycle | 139/139/138/137/137/135/135/136/136/136 | 130/130/130/130/127/127/127/127/127/128 |

After ten cycles, the values of the melting and crystallization temperatures, and also the corresponding enthalpies, tended to stabilize and the precision of the measurement was improved. Also after 10 cycles, the losses of mass remained practically negligible (<0.5 mg).

Comparative Example 1

By way of comparison, DSC experiments similar to those of example 2 were carried out on sebacic acid, a diacid that was used as raw material in the synthesis of the C10 diamide of example 1. Over 3 cycles at 10° C./min, the sebacic acid exhibited melting and crystallization temperatures of less than 150° C. (135° C. for the melting, 117° C. for the crystallization), even though the phase transition enthalpies were greater than those of the diamide (approx. 200 J/g).

A recurrent problem with the sebacic acid was the ease with which the samples lost mass during the DSC experiments, a phenomena which is absolutely not present in the case of the corresponding diamide. Thus, for example, during two different experiments carried out respectively over 5 cycles between 80° C. and 250° C. at 10° C./min and also over 5 cycles between 80° C. and 230° C. at 5° C./min, the losses of mass were respectively 6.4 and 7.2 mg, that is to say more than 70% of the initial mass of the sample. Although it is not possible to specify with certainty whether these losses were linked to an evaporation with or without degradation, from a point of view of the use of these products at high temperatures, this poses a problem, which is absent in the case of the corresponding diamides. A more thorough analysis of the DSC data seems to suggest that the loss of material took place starting from 200° C.

Thus, the sebacic diacid cannot be used as a phase change material in the range 150-200° C., unlike the corresponding diamide (C10 diamide) according to the invention, which additionally exhibits an outstanding stability (little or no loss of mass, reproducibility of the transitions) up to at least 250° C.

Example 3

Synthesis of Dinitriles

Charged to a 4 l stirred reactor, equipped with a dephlegmator, a tube for introducing ammonia, a nitrogen inerting system and an electric heater, were 2 kg (9.9 M) of sebacic acid in the solid state (melting point: 130-135° C.) and 1.25 g of zinc oxide. The temperature was gradually raised, without stirring, until the acid had melted (140° C.) then was raised, with stirring, up to 220° C. The dephlegmator was heated at 130° C. The ammonia began to be introduced at a nominal flow rate of 0.417 l/min and per kg, then the reaction temperature was gradually raised to 300° C. The temperature of 300° C. and the introduction of ammonia were kept at a hold until an acid value AV<0.1 mg of KOH/g was attained. The water formed and the excess ammonia were collected in a cold trap. At the end of the reaction, the reaction medium was transferred into the boiler of a distillation assembly. The crude product was distilled under reduced pressure at around 30-40 mmHg. The yield of sebaconitrile was 91% and its purity was greater than 99%.

Similarly, starting from 1,14-tetradecanedioic acid, 1,12-dodecanedinitrile was obtained with a yield of 89% and a purity of greater than 99%. Starting from 1,18-octadecanedioic acid, 1,16-hexadecanedinitrile was obtained with a yield of 90% and a purity of greater than 99%.

Example 4

DSC Analysis of the Dinitriles

DSC calorimetric analyses were carried out as explained in example 2, on the dinitriles synthesized in example 3. The melting/crystallization zone having, during an exploratory scan, been identified as lying below 120° C., scans at a ramp rate of 10° C./min in heating and cooling were carried out between −40° C. and 120° C. Table VI shows the values of the melting and recrystallization points, and also of the enthalpies of the corresponding transitions (melting or crystallization) for two dinitriles. The values obtained correspond to the third scan at 10° C./min, knowing that the DSC curves between the $2^{nd}$ and $3^{rd}$ scan can be superposed, which results in the good repeatability of the measurement.

TABLE VI

|  | 1,16-hexadecadinitrile | 1,12-dodecadinitrile |
|---|---|---|
| Melting temperature at the peak (° C.) | 60 | 38 |
| Crystallization temperature at the peak (° C.) | 47 | 26 |
| Enthalpy of fusion (J/g) | 195 | 186 |
| Enthalpy of crystallization (J/g) | 191 | 184 |

Example 5

Synthesis of C10 Bisamides

Charged to a 0.5 l glass reactor, equipped with a dephlegmator, a mechanical stirrer, a system for introducing gaseous ammonia and an electrical heating system, were 180 g, i.e. 0.9M, of sebacic acid.

The reaction medium was brought to 140° C. so as to melt the diacid. The stirring was started and the temperature was brought to 220° C. so as to be above the melting point of the sebacamide that it was desired to form. Next, the ammonia was gradually introduced using a dip tube. The temperature was maintained at 220° C. throughout the entire duration of the reaction, namely 4 h. The progress of the reaction was monitored by the acid value of the reaction medium and the assaying of the amide functions. The water formed and the excess ammonia were distilled from the reaction medium. At the end of the reaction, the sebacamide in the molten state, which had been obtained with a practically quantitative yield, was run off.

Example 6

DSC Analysis of the C10 Bisamides

DSC calorimetric tests were carried out using a DSC 821 machine sold by the company Mettler-Toledo using 30 µl stainless steel cells on the sebacamide synthesized in example 5. Cycles between 25° C. and 280° C. at 5° C./min were carried out. Two heating/cooling cycles were carried out. A first series of scans between 25° C. and 280° C. made it possible to identify the temperature zone of the melting phase transitions (on heating) and crystallization phase transitions (on cooling). This first series made it possible to demonstrate that no thermal phase transition phenomenon was observed below 25-50° C.

6A—Test Over 2 Cycles at 5° C./min

Table VII shows the values of the temperatures at the melting and crystallization peaks for the sebacamide synthesized in example 5, during tests over 2 heating/cooling cycles at 5° C./min between 25° C. and 280° C. The enthalpies of fusion and of crystallization are also given.

TABLE VII

|  | Sebacamide |
|---|---|
| Melting temperatures at the peak (° C.) $1^{st}/2^{nd}$ cycle | 205/204 |
| Crystallization temperatures at the peak (° C.) $1^{st}/2^{nd}$ cycle | 166/163 |
| Enthalpies of fusion (J/g) $1^{st}/2^{nd}$ cycle | 236/226 |
| Enthalpies of crystallization (J/g) $1^{st}/2^{nd}$ cycle | 215/209 |

It is observed that the enthalpies of fusion and of crystallization of the sebacamide between the first cycle and the second cycle remain close especially for the fusion. This demonstrates the thermal stability of the sebacamide.

Comparative Example 2

By way of comparison, DSC experiments similar to those from example 6 were carried out on adipamide (C6 bisamide), sold by the company Aldrich. The results are given in table VIII.

TABLE VIII

|  | Adipamide |
|---|---|
| Melting temperatures at the peak (° C.) $1^{st}/2^{nd}$ cycle | 228/216 |
| Crystallization temperatures at the peak (° C.) $1^{st}/2^{nd}$ cycle | 182/180 |
| Enthalpies of fusion (J/g) $1^{st}/2^{nd}$ cycle | 340/270 |
| Enthalpies of crystallization (J/g) $1^{st}/2^{nd}$ cycle | 252/206 |

It is observed that the differences in the enthalpies of fusion and crystallization between the first cycle and the second cycle for the adipamide are substantially greater than those observed for the sebacamide. This demonstrates the greater thermal stability of sebacamide compared to adipamide.

What is claimed is:

1. A process for the storage and for the release of thermal energy, comprising: a) contacting a wall to be cooled with a first heat transfer fluid thereby cooling the wall to be cooled; b) contacting a material comprising at least one compound having a $C_8$-$C_{24}$ saturated linear hydrocarbon-based chain bearing at each end a nitrogen-containing functional group, other than —$NH_2$ with said first heat transfer fluid, whereby said at least one compound absorbs and stores heat from the first heat transfer fluid; c) contacting said material with a second heat transfer fluid whereby heat stored in said at least one compound is released by said material into the second heat transfer fluid; and d) contacting a wall to be heated with said second heat transfer fluid containing heat released by said material, thereby heating the wall to be heated.

2. The process as claimed in claim 1, wherein said at least one compound is selected from the bisamides of formula (I):

$$R_1R_2N—CO—(CH_2)_n—CO—NR_1R_2 \qquad (I),$$

where n is an integer ranging from 6 to 24 and $R_1$, $R_2$ independently denote a hydrogen atom; a $C_1$-$C_{10}$ alkyl group; a group Ra—N-RbRc where Ra is a —$(CH_2)_x$—$(NH—CH_2—CH_2)_m$-chain where m is an integer ranging from 0 to 6, x is an integer ranging from 1 to 4 and Rb, Rc are each H or form together and with the nitrogen atom to which they are attached a nitrogen-containing heterocycle optionally interrupted by at least one other nitrogen atom and optionally substituted by an oxo group.

3. The process as claimed in claim 2, wherein n is an integer ranging from 8 to 16, $R_1$=H and $R_2$=Ra—N—RbRc where Ra is a —$CH_2$—$CH_2$— chain and Rb, Rc form a five- or six-membered saturated dinitrogen-containing heterocycle with the attached nitrogen atom.

4. The process as claimed in claim 3, wherein said at least one compound is the bisamide of UDETA and of a dicarboxylic acid of plant origin.

5. The process as claimed in claim 1, wherein said at least one compound is selected from the dinitriles of formula (II):

$$N≡C—(CH_2)_p—C≡N \qquad (II),$$

where p is an integer ranging from 8 to 24.

6. The process as claimed in claim 1, wherein said at least one compound is selected from the polyamines of formula (III) and organic and inorganic salts thereof:

$$R_3R_4N—(CH_2)_q—NR_3R_4 \qquad (III)$$

where q is an integer ranging from 6 to 24; $R_3$ is a propylamine, polypropylamine, alkylcarbonyl or alkylsulfonyl group optionally containing an alkoxylated unit $(CH_2—CH_2—O)_y$; and $R_4$ is H or a propylamine, polypropylamine, alkylcarbonyl or alkylsulfonyl group optionally containing an alkoxylated unit $(CH_2—CH_2—O)_y$ where y is an integer ranging from 1 to 6.

7. The process as claimed in claim 1, wherein the first heat transfer fluid is selected from the group consisting of air, water, glycols, brines of thermally conductive salts, silicone-based oils, oils resulting from the refining of petroleum cuts, oils of plant origin, and mixtures thereof.

8. The process as claimed in claim 1, wherein said at least one compound is a bisamide or an optionally salified bisamide derivative.

9. The process as claimed in claim 1, wherein said saturated linear hydrocarbon-based chain contains from 10 to 18 carbon atoms.

10. The process as claimed in claim 1, wherein said at least one compound is included in at least one of the following: a device for cooling food products or heat-sensitive pharmaceutical products; a textile material; an engine; electronic components or circuits; a device for heat recovery from chemical reactors or waste combustion plants; and, a device for the storage of solar energy.

11. The process as claimed in claim 1, wherein said at least one compound is selected from the group consisting of octadecanedioic acid UDETA diamide, tetradecanedioic acid UDETA diamide, decanedioic acid UDETA diamide, 1,12-dodecanedintrile, sebaconitrile, 1,16-hexadecanedinitrile, and sebacamide.

12. The process as claimed in claim 1, wherein said at least one compound is in the form of a material additionally containing at least one of titanium dioxide, a nucleating agent, or another phase change material capable of forming a eutectic mixture with said compound.

13. The process as claimed in claim 1, wherein said at least one compound is in encapsulated form.

14. The process as claimed in claim 1, wherein said at least one compound is included in synthetic textile fibers.

15. The process as claimed in claim 1, wherein said at least one compound is encapsulated in a casing comprising a polymer of polystyrene, polyvinyl alcohol or polyurethane.

* * * * *